Sept. 13, 1966   B. HAYTOCK III, ET AL   3,272,235
HOSE AND SUPPORT THEREFOR
Filed Oct. 23, 1963

*INVENTORS*
BENJAMIN HAYTOCK III
CHARLES STOWELL
BY
*Charles L. Lovercheck*
*Attorney*

United States Patent Office 3,272,235
Patented Sept. 13, 1966

3,272,235
HOSE AND SUPPORT THEREFOR
Benjamin Haytock III, Fairview, and Charles Stowell, Erie, Pa., assignors to Continental Rubber Works, Erie, Pa., a corporation of Pennsylvania
Filed Oct. 23, 1963, Ser. No. 318,345
4 Claims. (Cl. 138—107)

This invention relates to hose suspension devices and, more particularly, to hose suspension devices in combination with hoses and to processes for making the same.

The present invention involves an attachment for supporting a hose built into a hose construction as an integral part thereof. In its preferred form, the attachment consists of a plurality of laminations made of flexible fabric material of the number of plies necessary to support the hose. The plies are covered with rubber and the rubber is vulcanized at the same time the rubber cover of the hose is vulcanized. These suspension loops are spaced at intervals along the hose to suit the particular application.

Both the hose and the laminations are covered with rubber (synthetic or natural) for protecting them against the elements. The suspension devices may be used to suspend the hose from any support or structure or to submerge it in a liquid with weights or anchors or to suspend other objects from the hose.

The hose and loop suspension device may be made of any plastic, textiles, or rubber like materials.

It is, accordingly, an object of the present invention to provide an improved hose and suspension device in combination therewith.

Another object of the invention is to provide an improved hose suspension device.

Still another object of the invention is to provide an improved process for making a hose and loop suspension device therefor.

A further object of the invention is to provide a hose suspension device which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
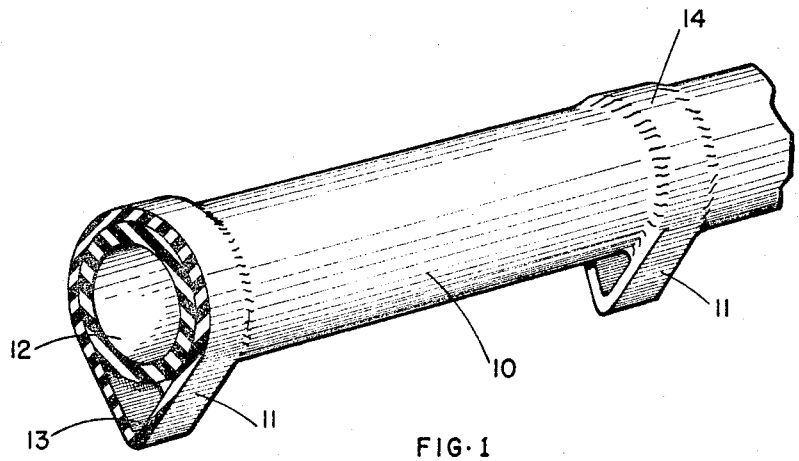
Figure 2:
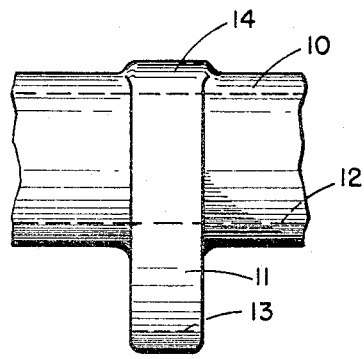
Figure 3:
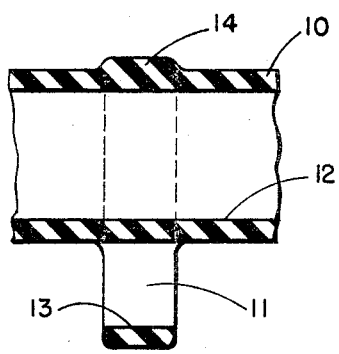

In the drawing:
FIG. 1 is an isometric view of a hose according to the invention showing its suspension device in cross section;
FIG. 2 is a partial side view of the hose and suspension device; and
FIG. 3 is a longitudinal cross sectional view of the hose and suspension device.

Now with more particular reference to the drawing, a hose 10 is shown having suspension loops 11 thereon. The suspension loops are larger than the hose 10 and have an opening between them and the hose which may be used to connect an anchor to the hose or it could receive hooks for supporting the hose. The hose 10 has an opening 12 therethrough. The hose may be of any suitable diameter and the suspension loops 11 may be spaced at suitable intervals. The loops are integrally attached to the hose around slightly more than one hundred eighty degrees of its circumference.

The hose 10 may be made of a plurality of layers of fabric with a rubber lining and a rubber cover. Around the outer layer of fabric may be placed a layer of rubber or band of rubber the size of the loop, to form an inner ply for the suspension loops 11. A suitable number of fabric band laminations approximately the width of the loop to be formed may be wrapped around the hose at 14 and a rubber lamination may be placed around the outside of these laminations. Then the entire hose and suspension loops may be vulcanized at the same time so that the suspension loops and the hose itself become a single integral unit.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A hose and suspension devices attached thereto comprising
    a hose having the outside surface thereof made of vulcanizable material,
    and suspension devices comprising loops slightly larger in diameter than said hose disposed around said hose and at spaced intervals thereon,
    said loops being made of vulcanizable material compatible with said hose and vulcanized thereto whereby said suspension devices are integral with said hose.

2. A method of making a hose and suspension devices comprising
    providing a hose of unvulcanized vulcanizable material,
    disposing loops in the form of rings made of unvulcanized vulcanizable material around said hose,
    and vulcanizing said loops and said hose together whereby said loops form integral suspension devices with said hose.

3. A hose and suspension devices therefor comprising
    a hose made of vulcanizable material having spaced collars therearound,
    said collars having the inside diameter slightly larger than the outside diameter of said hose,
    said collars being vulcanized to said hose around more than one hundred eighty degrees of the circumference of said hose.

4. A method of making a hose and suspension devices therefor comprising
    assembling a hose of a center layer of vulcanizable material, at least one layer of fabric material, and an outer layer of vulcanizable material,
    providing a plurality of spaced loops of vulcanizable material around said hose,
    each said loop being larger than the outside of said hose whereby a space is provided between a part of each said loop and the outside of said hose and said loops engage said hose around more than one hundred eighty degrees of the outer periphery thereof,
providing a plurality of plies of fabric loops around said first mentioned loops in intimate contact therewith,
providing a loop of vulcanizable material around the outside of said fabric loops,
and vulcanizing said loops and said hose at the same time whereby said loops become integral with said hose.

References Cited by the Examiner

UNITED STATES PATENTS 2,837,120  6/1958  Galloway ---------- 138—107

FOREIGN PATENTS 362,753  10/1931  Great Britain.

LAVERNE D. GEIGER, *Primary Examiner.*

C. HOUCK, *Examiner.*